(12) United States Patent
LeBlanc

(10) Patent No.: US 9,794,417 B2
(45) Date of Patent: *Oct. 17, 2017

(54) PACKET VOICE SYSTEM WITH FAR-END ECHO CANCELLATION

(75) Inventor: Wilfrid LeBlanc, Vancouver (CA)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 2178 days.

This patent is subject to a terminal disclaimer.

(21) Appl. No.: 12/033,775

(22) Filed: Feb. 19, 2008

(65) Prior Publication Data

US 2008/0205632 A1    Aug. 28, 2008

Related U.S. Application Data

(63) Continuation of application No. 10/327,781, filed on Dec. 23, 2002, now Pat. No. 7,333,447.

(51) Int. Cl.
    *H04M 9/08*      (2006.01)

(52) U.S. Cl.
    CPC .................................. *H04M 9/082* (2013.01)

(58) Field of Classification Search
    USPC ................................ 379/286, 406.01–406.16
    See application file for complete search history.

(56) References Cited

U.S. PATENT DOCUMENTS

| 5,764,753 | A * | 6/1998 | McCaslin | H04B 3/234 370/286 |
| 6,212,273 | B1 * | 4/2001 | Hemkumar | H03G 3/3005 379/392 |
| 6,765,931 | B1 * | 7/2004 | Rabenko et al. | 370/493 |
| 6,816,592 | B1 * | 11/2004 | Kirla | 379/406.05 |
| 2002/0064139 | A1 * | 5/2002 | Bist et al. | 370/289 |

(Continued)

FOREIGN PATENT DOCUMENTS

| WO | WO 98/34354 | 8/1998 |
| WO | WO 01/33814 | 5/2001 |

OTHER PUBLICATIONS

European Search Report corresponding to European Patent Application Serial No. 03024383.6-1246, dated Jun. 8, 2009.

*Primary Examiner* — Duc Nguyen
*Assistant Examiner* — Assad Mohammed
(74) *Attorney, Agent, or Firm* — Oblon, McClelland, Maier & Neustadt, L.L.P.

(57) ABSTRACT

A packet voice transceiver adapted to reside at a first end of a communication network and to send and receive voice packets to and from a second packet voice transceiver residing at a second end of the communication network. The transceiver includes a voice encoder, a packet transmitter, a packet receiver, a voice decoder and a far-end echo canceller. The voice encoder receives an ingress audio signal and encodes the audio signal to produce an ingress packet voice signal. The packet transmitter transmits the ingress packet voice signal over the network to the second packet voice transceiver. The packet receiver receives an egress packet voice signal transmitted over the network by the second packet voice transceiver. The voice decoder decodes the egress packet voice signal to produce an egress audio signal. The far-end echo canceller reduces echo that is present in the egress audio signal and that originated at the second end.

9 Claims, 5 Drawing Sheets

(56) References Cited

U.S. PATENT DOCUMENTS

2002/0080730 A1 6/2002 LeBlanc
2003/0053618 A1* 3/2003 Marchok ............... G10L 15/30
379/406.01

* cited by examiner

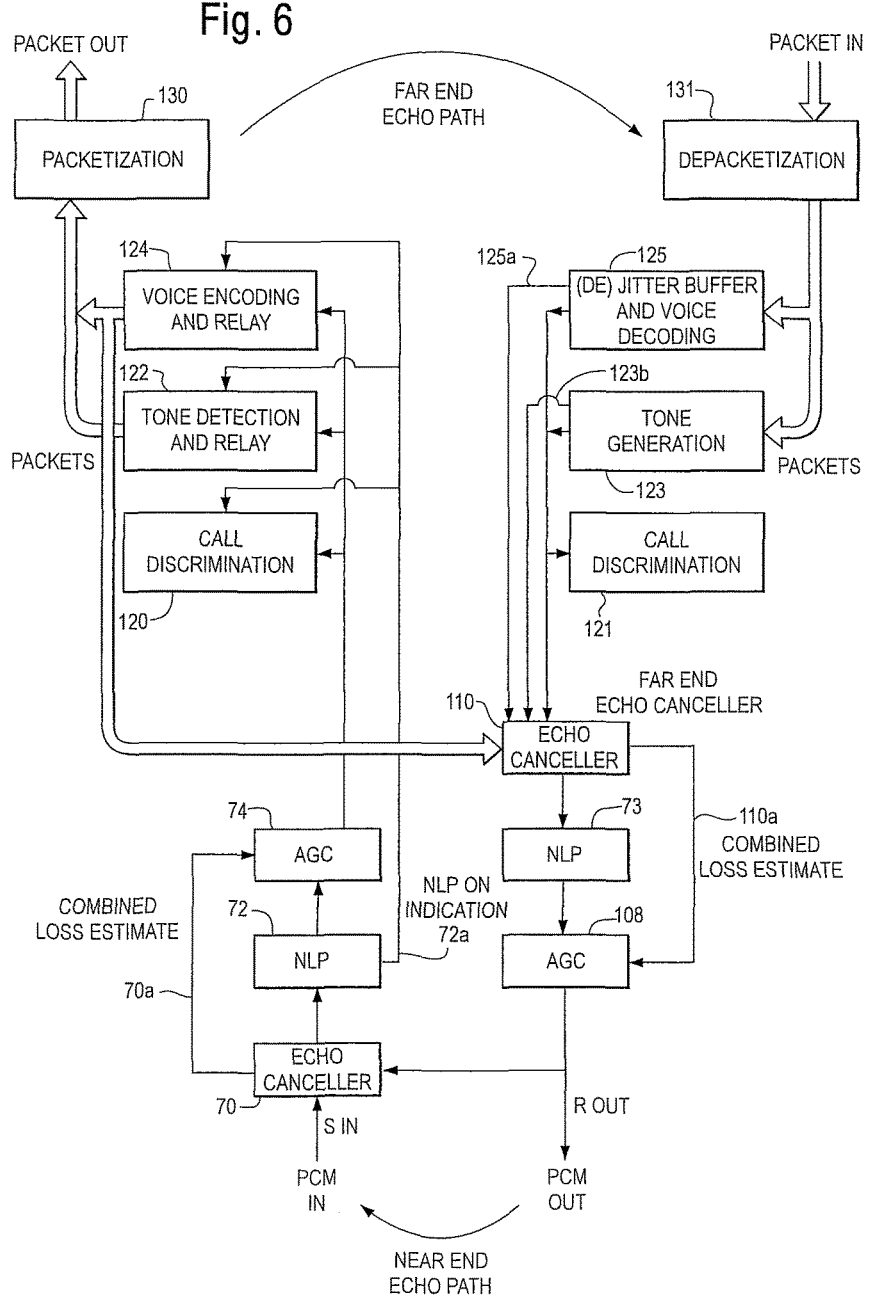

PACKET VOICE SYSTEM WITH FAR-END ECHO CANCELLATION

CROSS-REFERENCE TO RELATED APPLICATIONS

The present application is a continuation of U.S. patent application Ser. No. 10/327,781 (now U.S. Pat. No. 7,333,447), filed Dec. 23, 2002.

The present application is related to U.S. patent application Ser. No. 10/327,747, entitled "SELECTIVELY ADAPTABLE FAR-END ECHO CANCELLATION IN A PACKET VOICE SYSTEM," and U.S. patent application Ser. No. 10/327,773 (now U.S. Pat. No. 7,333,476), entitled "SYSTEM AND METHOD OF OPERATING A PACKET VOICE FAR-END ECHO CANCELLATION SYSTEM," both filed on even date herewith and both of which are expressly incorporated herein by reference as though set forth in full.

FIELD OF THE INVENTION

The present invention relates generally to packet voice communication systems, and more particularly, to far-end echo cancellation in a packet voice system.

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, an integrated system for interfacing various telephony devices over packet-based networks has been difficult due to the different modulation schemes of the telephony devices. Accordingly, it would be advantageous to have an efficient and robust integrated system for the exchange of voice, fax data and modem data between telephony devices and packet-based networks.

An echo canceller is a device that removes the echo present in a communication signal, typically by employing a linear transversal filter. Due to non-linearities in hybrid and digital/analog loops and estimation uncertainties, linear cancellers cannot entirely remove the echo present. A non-linear device, commonly referred to as a non-linear processor (NLP), can be used to remove the remaining echo. This device may be a variable loss inserted into the system, a device that removes the entire signal and injects noise with the correct level, and possibly the correct spectrum, or a combination thereof.

Existing echo cancellers in packet voice communication devices endeavor to suppress echo in the ingress signal, that is, the signal that the device sends out over the network. This is typically an echo of the egress signal (the signal that the device receives from the network) that occurs at the device. However, many packet voice transceivers do not have echo cancellers. When a first packet voice transceiver is communicating with a second packet voice transceiver over a network and the second device does not employ echo cancellation on its ingress signal, the first device may receive an egress signal transmitted by the second device that contains echo. Thus it would be advantageous to be able to efficiently suppress echo that is present in such an egress signal. However, cancellation of echo present in the egress signal is problematic because the echo path includes a round-trip journey over the communication network, as well as all of the processing performed on the signal by the packet voice transceiver at the other end of the network.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a packet voice transceiver adapted to reside at a first end of a communication network and to send and receive voice packets to and from a second packet voice transceiver residing at a second end of the communication network. The transceiver includes a voice encoder, a packet transmitter, a packet receiver, a voice decoder and a far-end echo canceller. The voice encoder receives an ingress audio signal and encodes the audio signal to produce an ingress packet voice signal. The packet transmitter transmits the ingress packet voice signal over the network to the second packet voice transceiver. The packet receiver receives an egress packet voice signal transmitted over the network by the second packet voice transceiver. The voice decoder decodes the egress packet voice signal to produce an egress audio signal. The far-end echo canceller reduces echo that is present in the egress audio signal and that originated at the second end.

Another aspect of the present invention is directed to a method of operating a packet voice transceiver that resides at a first end of a communication network and that sends and receives voice packets to and from a second packet voice transceiver residing at a second end of the communication network. Pursuant to the method, an ingress audio signal is received and encoded to produce an ingress packet voice signal. The ingress packet voice signal is transmitted over the network to the second packet voice transceiver. An egress packet voice signal transmitted over the network by the second packet voice transceiver is received. The egress packet voice signal is decoded to produce an egress audio signal. Echo that is present in the egress audio signal and that originated at the second packet voice transceiver is reduced.

Another embodiment of the present invention is directed to a far-end echo canceller adapted to reside in a packet voice transceiver at a first end of a communication network. The packet voice transceiver is adapted to send an ingress audio data signal to, and receive an egress audio data signal from, a second packet voice transceiver residing at a second end of the communication network. The far-end echo canceller reduces echo that is present in the egress audio data signal and that originated at the second end. The far-end echo canceller includes an echo path model and a digital subtractor. The echo path model samples the ingress audio data signal and models the echo path followed by the ingress audio data signal and an echo of the ingress audio signal present in the egress audio signal to produce an estimate of the echo that is present in the egress audio data signal and that originated at the second end. The digital subtractor subtracts the echo estimate from the egress audio signal.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 6 is a functional block diagram illustrating the services invoked by a packet voice transceiver system according to an illustrative embodiment of the present invention.

DETAILED DESCRIPTION

In an illustrative embodiment of the present invention, a signal processing system is employed to interface voice telephony devices with packet-based networks. Voice telephony devices include, by way of example, analog and digital phones, ethernet phones, Internet Protocol phones, interactive voice response systems, private branch exchanges (PBXs) and any other conventional voice telephony devices known in the art. The described preferred embodiment of the signal processing system can be implemented with a variety of technologies including, by way of example, embedded communications software that enables transmission of voice data over packet-based networks. The embedded communications software is preferably run on programmable digital signal processors (DSPs) and is used in gateways, remote access servers, PBXs, and other packet-based network appliances.

Figure 1:
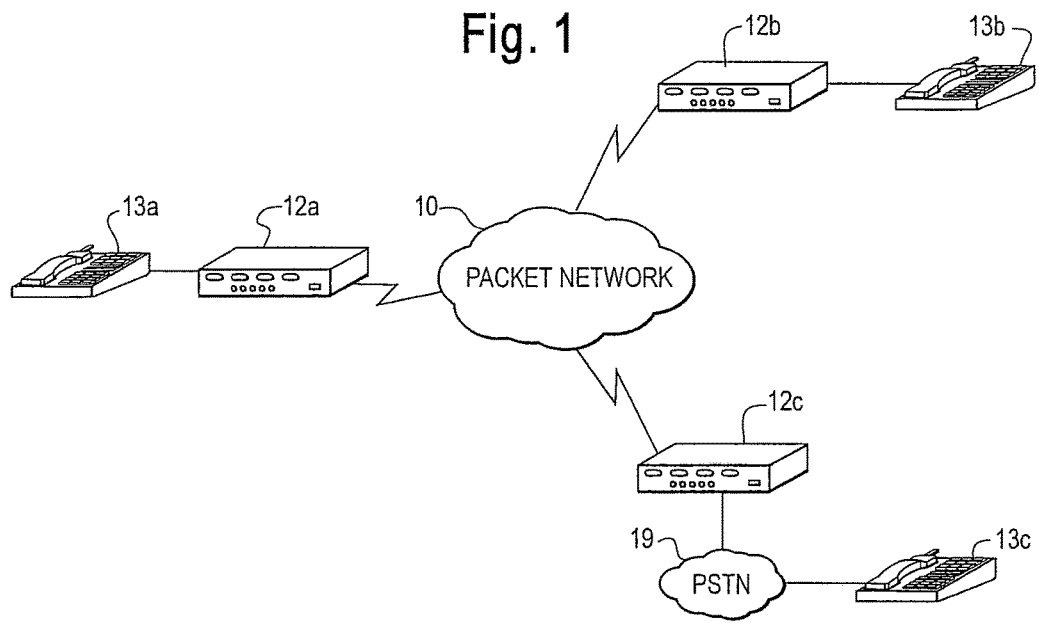
FIG. 1 is a functional block diagram representing a communication system in which the present invention may operate.

FIG. 1 is a functional block diagram representing a communication system that enables the transmission of voice data over a packet-based system such as Voice over IP (VoIP, H.323), Voice over Frame Relay (VoFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Packet-based network 10 provides a communication medium between telephony devices. Network gateways 12a and 12b support the exchange of voice between packet-based network 10 and telephony devices 13a and 13b. Network gateways 12a and 12b include a signal processing system which provides an interface between the packet-based network 10 and telephony devices 12a and 12b. Network gateway 12c supports the exchange of voice between packet-based network 10 and a traditional circuit-switched network 19, which transmits voice data between packet-based network 10 and telephony device 13a. In the described exemplary embodiment, each network gateway 12a, 12b, 12c supports a telephony device 13a, 13b, 13c.

Each network gateway 12a, 12b, 12c could support a variety of different telephony arrangements. By way of example, each network gateway might support any number of telephony devices, circuit-switched networks and/or packet-based networks including, among others, analog telephones, ethernet phones, fax machines, data modems, PSTN lines (Public Switching Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a circuit-switched network such as a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13×), CDMA (IS-9×) or GSM for terrestrial wireless applications, or any other packet-based system.

Figure 1A:
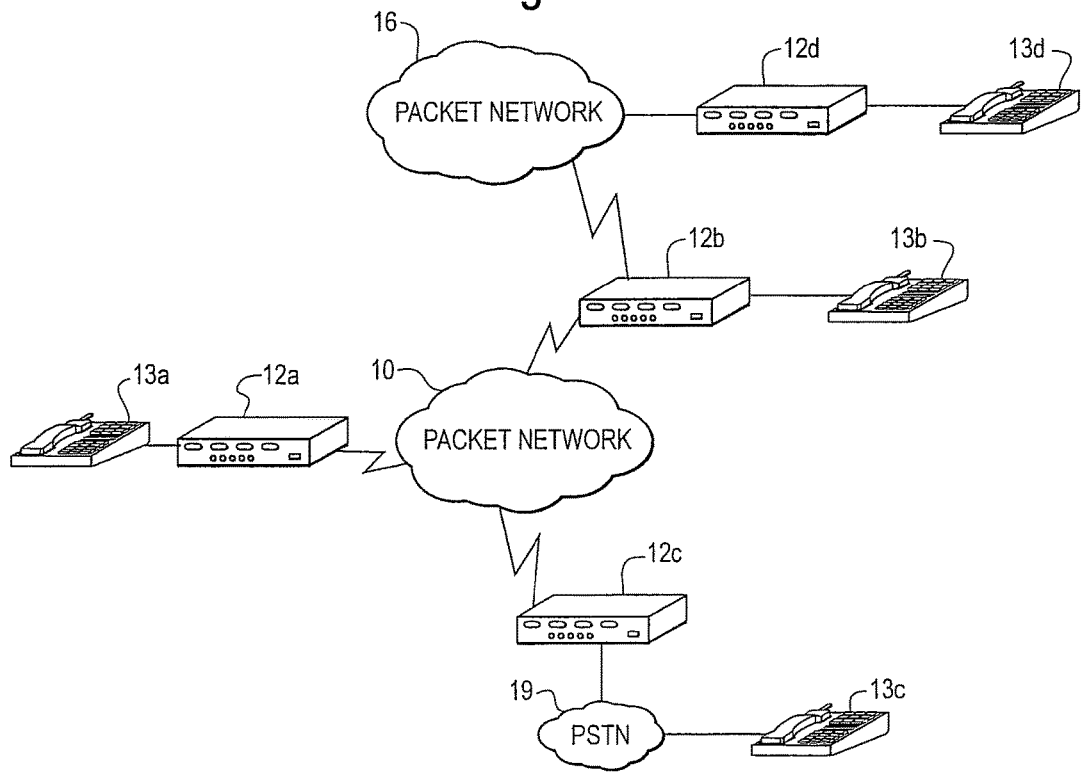
FIG. 1A is a functional block diagram representing a communication system in which the present invention may operate.

Another exemplary topology is shown in FIG. 1A. The topology of FIG. 1A is similar to that of FIG. 1 but includes a second packet-based network 16 that is connected to packet-based network 10 and to telephony device 13b via network gateway 12b. The signal processing system of network gateway 12b provides an interface between packet-based network 10 and packet-based network 16 in addition to an interface between packet-based networks 10, 16 and telephony device 13b. Network gateway 12d includes a signal processing system which provides an interface between packet-based network 16 and telephony device 13d.

Figure 2:
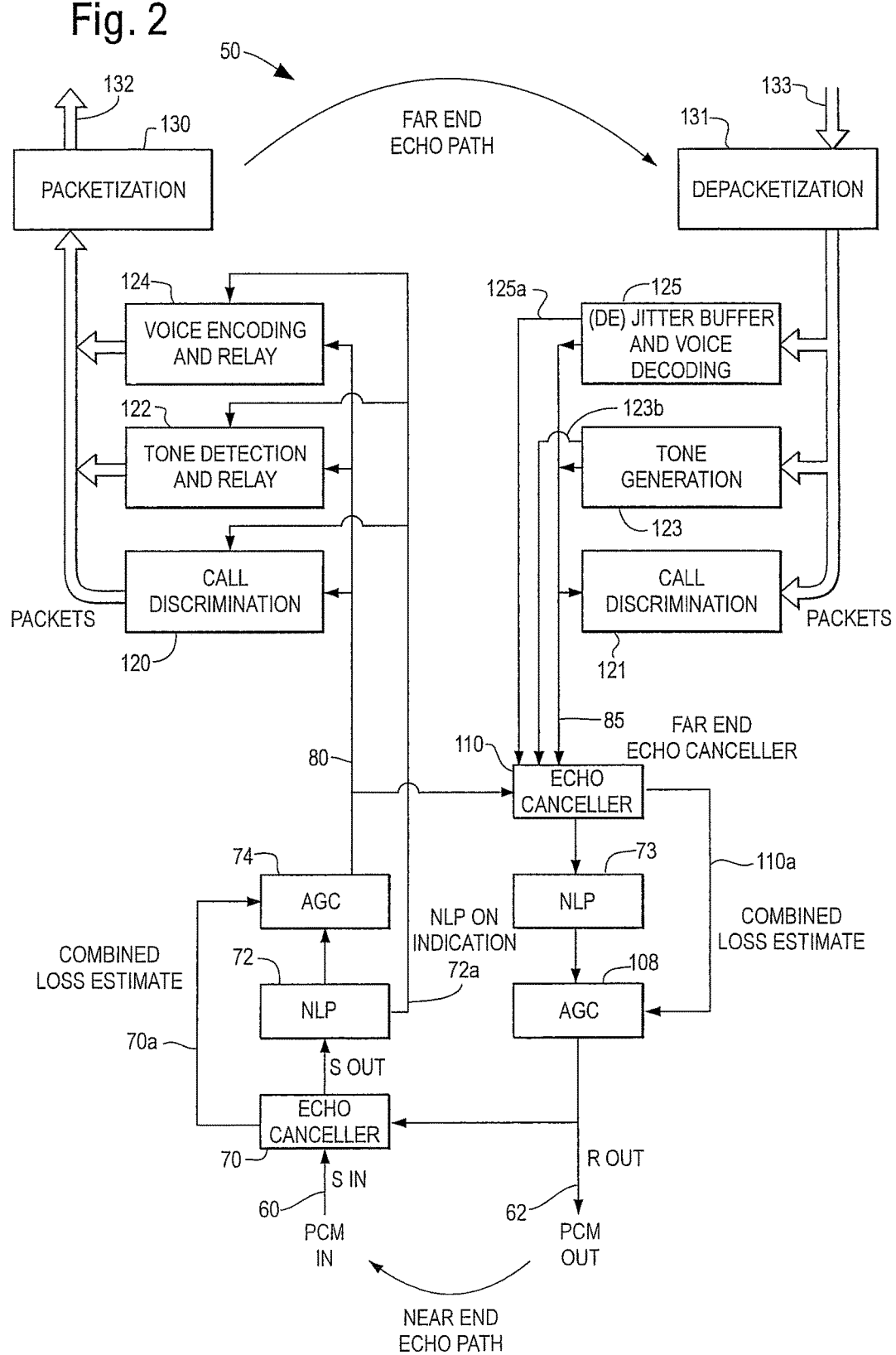
FIG. 2 is a functional block diagram illustrating the services invoked by a packet voice transceiver system according to an illustrative embodiment of the present invention.

FIG. 2 is a block diagram illustrating the services invoked by a packet voice transceiver system 50 according to an illustrative embodiment of the present invention. In an illustrative embodiment of the present invention, the packet voice transceiver system 50 resides in a network gateway such as network gateways 12a, 12b, 12c, 12d of FIGS. 1 and 1A. In an exemplary embodiment, Packet voice transceiver system 50 provides two-way communication with a telephone or a circuit-switched network, such as a PSTN line (e.g. DS0). The transceiver 50 receives digital voice samples 60, such as a 64 kb/s pulse code modulated (PCM) signal, from a telephone or circuit-switched network.

The incoming PCM signal 60 is initially processed by a near-end echo canceller 70 to remove far-end echoes that might otherwise be transmitted back to the far-end user. As the name implies, echoes in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

For the purposes of this patent application, the user from which the ingress PCM signal 60 is received will be referred to as the near-end user. Thus the outgoing (egress) PCM signal 62 is provided to the near-end user. The user that receives the ingress packet voice signal 132, and that transmits the egress packet voice signal 133, will be referred to as the far-end user. However, it is to be understood that the "near-end" user, that sends and receives PCM signals 60 and 62, respectively, may reside either at a local device (such as a telephone) or at a device located across a circuit switched network.

Near-end echo canceller 70 is used to remove echoes of far-end speech present on the incoming PCM signal 60 before routing the incoming PCM signal 60 back to the far-end user. The near-end echo canceller 70 samples an outgoing PCM signal 62 from the far-end user, filters it, and combines it with the incoming PCM signal 60. In an exemplary embodiment, the near-end echo canceller 70 is followed by a non-linear processor (NLP) 72 which may mute the digital voice samples when far-end speech is detected in the absence of near-end speech. The NLP 72 may also inject comfort noise, which, in the absence of near end speech, may be roughly at the same level as the true background noise or at a fixed level.

After echo cancellation, the power level of the digital voice samples is normalized by automatic gain control (AGC) 74 to ensure that the conversation is of an acceptable loudness. Alternatively, the AGC can be performed before the near-end echo cancellation 70. However, this approach would entail a more complex design because the gain would also have to be applied to the sampled outgoing PCM signal 62. In the described exemplary embodiment, the AGC 74 is designed to adapt slowly in normal operation, but to adapt more quickly if overflow or clipping is detected. In one embodiment, the AGC adaptation is held fixed if the NLP 72 is activated.

In the voice mode, the transceiver 50 invokes three services, namely call discrimination 120, packet voice exchange 124, and packet tone exchange 122. The call discriminator analyzes the digital voice samples to determine whether a 2100 Hz tone (as in the case when the telephony device is a fax or a modem), a 1100 Hz tone or V.21 modulated high-level data link control (HDLC) flags (as in the case when the telephony device is a fax) are present. If a 1100 Hz tone or V.21 modulated HDLC flags are detected, a calling fax machine is recognized. The voice mode services are then terminated and the packet fax exchange is invoked to process the call. If a 2100 Hz tone is detected, the voice mode services are terminated and the packet data exchange is invoked. In the absence of a 2100 Hz tone, a 1100 Hz tone, or HDLC flags, the digital voice samples are coupled to the encoder system 124 and tone detection 122. The encoder system illustratively includes a voice encoder, a voice activity detector (VAD) and a comfort noise estimator. Tone detection 122 illustratively comprises a dual tone multi-frequency (DTMF) detector and a call progress tone detector. The outputs of the call discriminator 120, tone detection 122 and voice encoder 124 are provided to a packetization engine 130 which packetizes the data and transmits the packets 132 over the packet voice network.

Typical telephone conversations have as much as sixty percent silence or inactive content. Therefore, high bandwidth gains can be realized if digital voice samples are suppressed during these periods. In an illustrative embodiment of the present invention, a voice activity detector (VAD), operating under the packet voice exchange 124, is used to accomplish this function. The VAD attempts to detect digital voice samples that do not contain active speech. During periods of inactive speech, a comfort noise estimator, also operating under the packet voice exchange 124, provides silence identifier (SID) packets to the packetization engine 130. The SID packets contain voice parameters that allow the reconstruction of the background noise at the far end.

From a system point of view, the VAD may be sensitive to the change in the NLP 72. For example, when the NLP 72 is activated, the VAD may immediately declare that voice is inactive. In that instance, the VAD may have problems tracking the true background noise level. If the NLP 72 generates comfort noise during periods of inactive speech, it may have a different spectral characteristic from the true background noise. The VAD may detect a change in noise character when the NLP 72 is activated (or deactivated) and declare the comfort noise as active speech. For these reasons, in an illustrative embodiment of the present invention, the VAD is disabled when the NLP 72 is activated, as indicated by a "NLP on" message 72a passed from the NLP 72 to the voice encoding system 124.

The voice encoder, operating under the packet voice exchange 124, can be a straight 16-bit PCM encoder or any voice encoder which supports one or more of the standards promulgated by ITU. The encoded digital voice samples are formatted into a voice packet (or packets) by the packetization engine 130. These voice packets are formatted according to an applications protocol and outputted to the host (not shown). The voice encoder is invoked only when digital voice samples with speech are detected by the VAD.

In the described exemplary embodiment, voice activity detection is applied after the AGC 74. This approach provides optimal flexibility because the VAD and the voice encoder are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange 122, a DTMF detector determines whether or not there is a DTMF signal present at the near end. The DTMF detector also provides a pre-detection flag which indicates whether or not it is likely that the digital voice sample might be a portion of a DTMF signal. If so, the pre-detection flag is relayed to the packetization engine 130 instructing it to begin holding voice packets. If the DTMF detector ultimately detects a DTMF signal, the voice packets are discarded, and the DTMF signal is coupled to the packetization engine 130. Otherwise the voice packets are ultimately released from the packetization engine 130 to the host (not shown). The benefit of this method is that there is only a temporary impact on voice packet delay when a DTMF signal is pre-detected in error, and not a constant buffering delay. In one embodiment, whether voice packets are held while the pre-detection flag is active is adaptively controlled by the user application layer.

A call progress tone detector also operates under the packet tone exchange 122 to determine whether a precise signaling tone is present at the near end. Call progress tones are tones that indicate what is happening to dialed phone calls. Conditions like busy line, ringing called party, bad number, and others each have distinctive tone frequencies and cadences assigned them. The call progress tone detector monitors the call progress state, and forwards a call progress tone signal to the packetization engine 130 to be packetized and transmitted across the packet-based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the packet voice transceiver system 50 essentially performs the inverse operation of the encoding system. The decoding system comprises a depacketizing engine 131, a call discriminator 121, tone generation functionality 123 and a voice decoding system 125.

The depacketizing engine 131 identifies the type of packets received from the host (i.e., voice packet, DTMF packet, call progress tone packet, SID packet) and transforms them into frames that are protocol-independent. The depacketizing engine 131 then provides the voice frames (or voice parameters in the case of SID packets) to the voice decoding system 125 and provides the DTMF frames and call progress tones to the tone generation functionality 123. In this manner, the remaining tasks are, by and large, protocol independent.

The voice decoding system 125 illustratively includes a jitter buffer that compensates for network impairments such as delay jitter caused by packets not arriving at the same time or in the same order in which they were transmitted. In addition, the jitter buffer compensates for lost packets that occur on occasion when the network is heavily congested. In one embodiment, the jitter buffer for voice includes a voice synchronizer that operates in conjunction with a voice queue to provide an isochronous stream of voice frames to the voice decoder.

In addition to a voice decoder and a jitter buffer, the voice decoding system 125 also illustratively includes a comfort noise generator and a lost packet recovery engine, a VAD and a comfort noise estimator. Sequence numbers embedded into the voice packets at the far end can be used to detect lost packets, packets arriving out of order, and short silence periods. The voice synchronizer analyzes the sequence numbers, enabling the comfort noise generator during short silence periods and performing voice frame repeats via the lost packet recovery engine when voice packets are lost. SID packets can also be used as an indicator of silent periods causing the voice synchronizer to enable the comfort noise generator. Otherwise, during far end active speech, the voice synchronizer couples voice frames from the voice queue in an isochronous stream to the voice decoder. The voice decoder decodes the voice frames into digital voice samples suitable for transmission on a circuit switched network, such as a 64 kb/s PCM signal for a PSTN line. The output of the voice decoder is provided to the far-end echo canceller 110.

The comfort noise generator of the voice decoding system 125 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator from the voice parameters in the SID packets buffered in the voice queue. However, for some protocols, namely, FRF-11, the SID packets are optional, and other far end users may not support SID packets at all. In these systems, the voice synchronizer must continue to operate properly. In the absence of SID packets, the voice parameters of the background noise at the far end can be determined by running the VAD at the voice decoder in series with a comfort noise estimator.

The tone generation functionality 123 illustratively includes a DTMF queue, a precision tone queue, a DTMF synchronizer, a precision tone synchronizer, a tone generator, and a precision tone generator. When DTMF packets arrive, they are depacketized by the depacketizing engine 131. DTMF frames at the output of the depacketizing engine 131 are written into the DTMF queue. The DTMF synchronizer couples the DTMF frames from the DTMF queue to the tone generator. Much like the voice synchronizer, the DTMF synchronizer provides an isochronous stream of DTMF frames to the tone generator. The tone generator of the tone generation system 123 converts the DTMF signals into a DTMF tone suitable for a standard digital or analog telephone, and provides the DTMF signal to the far-end echo canceller 110.

When call progress tone packets arrive, they are depacketized by the depacketizing engine 131. Call progress tone frames at the output of the depacketizing engine 131 are written into the call progress tone queue of the tone generation functionality 123. The call progress tone synchronizer couples the call progress tone frames from the call progress tone queue to a call progress tone generator. Much like the DTMF synchronizer, the call progress tone synchronizer provides an isochronous stream of call progress tone frames to the call progress tone generator. The call progress tone generator converts the call progress tone signals into a call progress tone suitable for a standard digital or analog telephone, and provides the DTMF signal to the far-end echo canceller 110.

Far-end echo canceller 110 is used to remove echoes of near-end speech present on the outgoing PCM signal 62 before providing the outgoing PCM signal 62 to the near-end user or circuit-switched network. The far-end echo canceller 110 samples an ingress PCM signal 80 from the near-end user, filters it, and combines it with the egress PCM signal 85. In an exemplary embodiment, the far-end echo canceller 110 is followed by a non-linear processor (NLP) 73 which may mute the digital voice samples when near-end speech is detected in the absence of far-end speech. The NLP 77 may also inject comfort noise, which, in the absence of near end speech, may be roughly at the same level as the true background noise or at a fixed level. In an alternative embodiment, the NLP 77 suppresses the samples by a fixed or variable gain. In yet another embodiment, the NLP combines these two schemes.

The NLP 73 provides the echo-cancelled PCM signal to automatic gain control (AGC) element 108. AGC 108 normalizes the power level of the digital voice samples to ensure that the conversation is of an acceptable loudness. Alternatively, the AGC can be performed before the far-end echo cancellation 110. In the described exemplary embodiment, the AGC 108 is designed to adapt slowly in normal operation, but to adapt more quickly if overflow or clipping is detected. In one embodiment, the AGC adaptation is held fixed if the NLP 73 is activated. The AGC 108 provides the normalized PCM signal to the PCM output line 62.

Figure 3:
FIG. 3 is a functional block diagram representing a communication system in which the present invention may operate.

FIG. 2 shows two echo cancellers: near-end echo canceller 70 and far-end echo canceller 110. In most typical systems, the transceiver systems on both ends of a communication would have a "near-end" echo canceller, i.e., an echo canceller that cancels echo of the egress far-end signal that is present in the ingress near-end signal before transmitting the ingress near-end to the far end. FIG. 3 is a functional block diagram representing an illustrative communication. In FIG. 3, the voice from talker 1 (300) is processed by transceiver system 1 (310), which transmits a packetized signal over packet network 320 to transceiver system 2 (330), which processes the packet signal and provides an audio signal to talker 2 (340). Similarly, the voice from talker 2 (340) is processed by transceiver system 2 (330), which transmits a packetized signal over packet network 320 to transceiver system 1 (310), which processes the packet signal and provides an audio signal to talker 1 (300). The near-end echo canceller in system 1 (310) operates on behalf of talker 2 (340). In other words, if the echo canceller in system 1 (310) is disabled, then talker 2 (340) will perceive echo (assuming the round trip delay in the packet network 320 is larger than about 10-20 msec or so). The near-end echo canceller in system 2 (330) operates on behalf of talker 1 (300). Thus, if the echo canceller in system 2 (330) is disabled, then talker 1 (300) will perceive echo. The near-end echo cancellers are referred to as such because they cancel echo generated on the near end. That is, the near-end echo canceller in system 1 removes echo generated between system 1 (310) and talker 1 (300), echo that the far-end (talker 2) would perceive.

Now, for purposes of illustration, assume that system 2 (330) doesn't have an echo canceller. This might be true for a variety of reasons, including for example, cost reasons, because the designer of system 2 (330) thought the delay would be low and an echo canceller wouldn't be necessary, or because the echo canceller in system 2 (330) is ineffective. To cope with this situation, the present invention provides a transceiver system that cancels echo in both directions. The near-end echo canceller, such as echo canceller 70 of FIG. 2, cancels "near-end" echo for the benefit of the far-end user. The far-end echo canceller, such as echo canceller 110 of FIG. 2, cancels "far-end" echo for the benefit of the near-end user.

Figure 4:
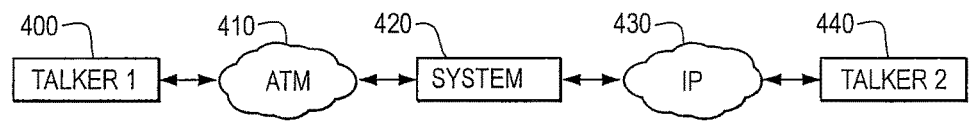
FIG. 4 is a functional block diagram representing a communication system in which the present invention may operate.

Another example would be a device which bridged two different networks. i.e., a bridge between ATM and IP networks. FIG. 4 is a functional block diagram representing another communication system in which the present invention could be employed. In the communication shown in FIG. 4, talker 1 (400) accesses a packet voice network 410 via a device that doesn't have echo control. Talker 2 (440) accesses a voice over IP (VoIP) system 430 via a device without echo control.

In an illustrative embodiment of the present invention, the transceiver system 420 that transcodes between voice over IP and voice over ATM has two echo cancellers. However, it does not make a lot of sense to call one "near end" and one "far end". Both are operating over a packet voice network, and the concept of "near" and "far" Which is ambiguous. For purposes of explanation in the present application, the two echo cancellers in such a transceiver are sometimes referred to as a near-end echo canceller and a far-end echo canceller. However, it is to be understood that in certain implementations of the present invention, the terms "near-end" and "far-end" hold little, if any literal meaning.

Referring again to FIG. 2, there are two echo cancellers shown: one referred to as near-end echo canceller 70 and one referred to as far-end echo canceller 110. The near-end canceller 70 monitors the samples 62 that are sent towards the phone. These samples go towards the phone and are echoed back. The echo is substantially always present and the non-linearities in that path are minimal. There is no (or very little) time-varying component. The echo (which is almost linear) is almost completely removed by the linear component of the echo canceller 70. The fact that it is nearly linear and non-time-varying makes removing the echo easier.

The far-end echo canceller 110 monitors the samples 80 going out of the AGC 74 towards the packet network. These samples get compressed by the voice coder 124 and sent across the packet network. At the far end they illustratively go through the jitter buffer, voice decoder, get echoed at the end device, AGC, VAD, voice coder, etc. Furthermore, the far-end device might not have a (near-end) echo canceller/NLP, or might have an ineffective echo canceller/NLP. Then, at the near end, the packets (potentially with far-end speech+ echo) go through the jitter buffer, packet loss concealment, and voice decoder of voice decoding system 125. Far-end echo canceller 110 then attempts to remove the far-end echo. There are numerous sources of non-linearities, variable delay jitter buffers) and variable attenuation (due to AGC at the far end) in the echo path. Once the echo model is estimated by the echo canceller 110, it may change immediately. Furthermore, the echo model is (usually) linear, and there are numerous non-linear devices within the system. The present invention endeavors to cope with these problems.

Figure 5:
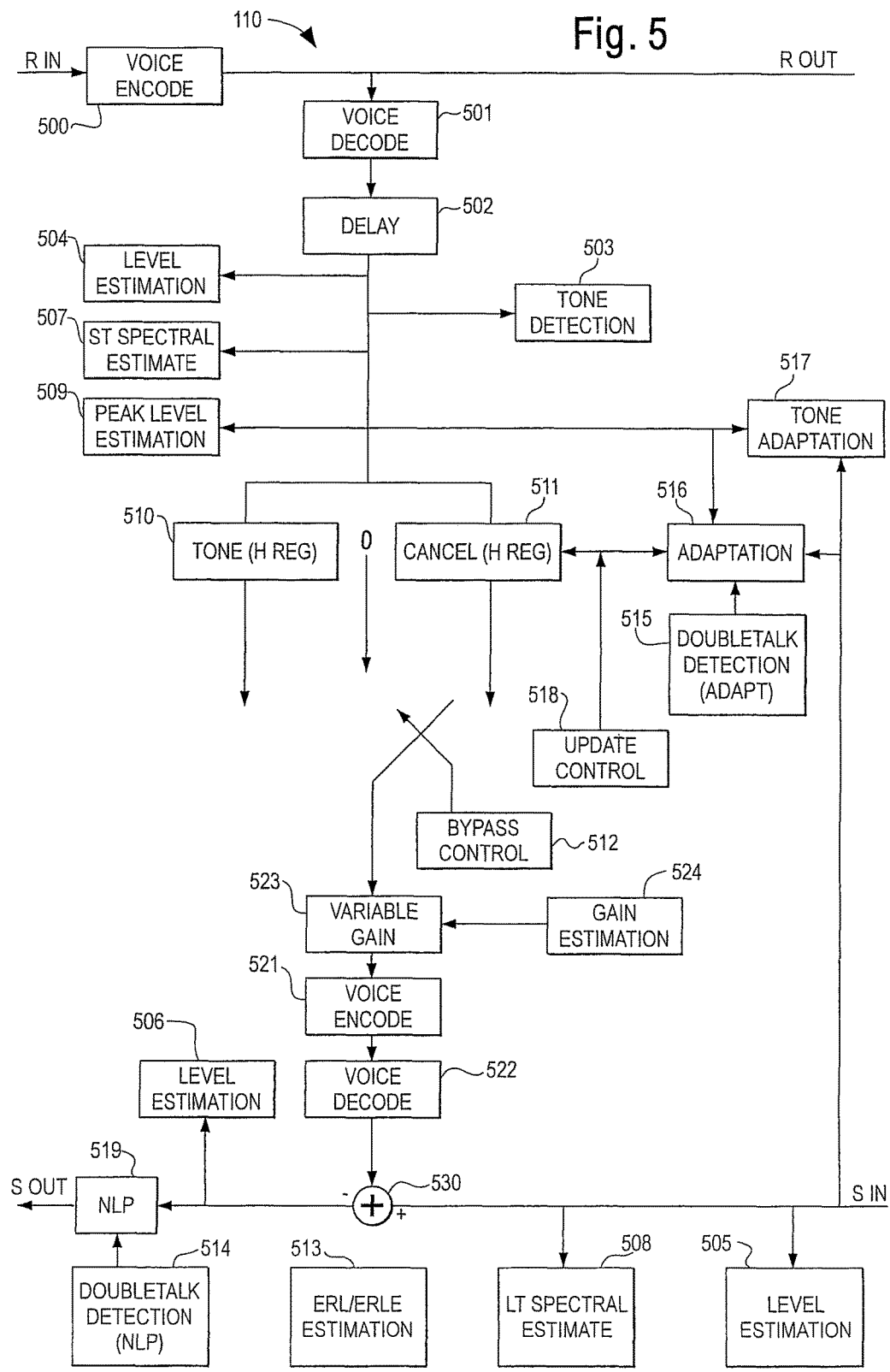
FIG. 5 is a functional block diagram representing the functionality of a far-end echo canceller according to an illustrative embodiment of the present invention.

FIG. 5 is a functional block diagram representing the functionality of far-end echo canceller 110. $R_{in}$ and $R_{out}$ are samples from the output of AGC 74 (FIG. 2). $S_{out}$ is provided to the AGC (108) and $S_{in}$ is provided from some combination of the voice decoder 125 and the tone generator 123.

The voice encode block 521 and voice decode blocks 501, 522 are meant to take into account any non-linearities due to the network format. For example, if ITU-T standard G.711 is used to represent the TDM samples, then the echo canceller takes into account the non-linearity introduced by the encoding and decoding of G.711 on both the ingress 500, 501 and egress 521, 522 path. The transcoding on the receive path (Rin to Rout) is taken into account by having voice decode operation 501 available prior to the transversal filter 509, 510. This transcoding also may be present on the send path ($S_{in}$ to $S_{out}$) and is modeled in voice encode block 521 and voice decode block 522.

In a far-end echo canceller, the voice encode/decode operation 501, 502 could be a low bit rate voice coder (such as ITU-T standard G.729). As such, the encode and decode operation would be a G.729 transcoding (potentially with VAD). The encode operation in blocks 521 and 522 may not be the same encode/decode operation as that in blocks 500 and 501. Given that the encode operation is performed on the ingress path the echo canceller only needs to decode the encoded bit stream output by voice decoder 124 of FIG. 2. This is shown in FIG. 6.

Because accounting for encoding and decoding operations with decode blocks 501 and 522 and encode block 521 may overly complicate system operation, in an alternative embodiment of the present invention, the far-end echo canceller 110 does not include decode blocks 501 and 522 and encode block 521. In this alternative embodiment, the reference signal is applied by the output of 74 as shown in FIG. 2.

Any known (minimum) fixed delay in the system between $R_{out}$ and $S_{in}$ is incorporated into a bulk delay 502. This simply ensures the echo canceller can cancel over the greatest possible delay range.

Tone detection 503 detects the presence of continuity test (COT) tones (1780 Hz, 2010 Hz, 2400 Hz, 2600 Hz, 2400+2600 Hz) dial tone, and some modem tones. Presence of these tones may place the echo canceller in a bypass mode 512 or may control the aggressiveness of the NLP 519.

The level estimators 504, 505, 506 calculate peak power levels, average power levels over 5 msec and 35 msec rectangular windows, and minimum background noise levels (using a non-linear minimum tracking algorithm). Level estimator 504 operates on the ingress signal, $R_{out}$. Level estimator 505 operates on the egress signal, $S_{in}$. Level estimator 506 operates on the egress signal after cancellation. The outputs of the level estimators are used for doubletalk detection for adaptation 515, NLP 514, ERL and ERLE estimation 513, and the bypass control 512.

The short-term (ingress signal) spectral estimate 507 is illustratively a spectral estimate over the length of the tail of the echo canceller or 16 msec, whichever is greater. The estimate is used in the tone detectors 503, the doubletalk detector 514 for NLP 519, and in bypass control 512. In an illustrative embodiment, the short-term spectral estimate is a 6th order LPC autocorrelation method. The autocorrelation values are computed based on a rectangular window recursively. The long-term spectral estimate 508 is illustratively a 6th order spectral estimate computed using a normalized LMS algorithm (with a small step size). The estimate is intended to be the spectral estimate of the background noise. In an illustrative embodiment of the present invention, the long-term spectral estimate 508 is frozen if the egress or ingress level is high.

The peak level estimator 509 illustratively computes the peak level over a sliding window of duration 5-30 msec over the tail length of the echo canceller. For example, for a 128 msec echo canceller, the peak level is the peak power using a 5-30 msec window over a sliding window over the full 128 msec.

The tone canceller 510 is a short tail length echo canceller designed to work for periodic or near periodic signals. If the signal at Rin is periodic or nearly periodic, then a short tail length echo canceller will perform suitably well. In an illustrative embodiment of the present invention, if the short tail canceller 510 performs well, the long tail canceller 511 (the main canceller) adaptation process can be inhibited to minimize divergence (and reduce processing requirements). Typical sources of echoes are limited to about 4 to 12 msec of dispersion (and typically less than 8 msec). Due to delays in the echo path, these locations of these echoes may be anywhere within the 128 msec echo tail.

The main (foreground) canceller 511 is a sparse canceller. In an illustrative embodiment, the main canceller 511 has a total of about 24 msec (192 taps) of coefficients. The coefficients are specified by a starting location and a duration. This will allow the sparse echo canceller 511 to cancel up to three sources of echo, which is the maximum number of distinct reflectors expected to be encountered.

The bypass logic 512 detects when it is better to use the tone canceller 510, the foreground (main) canceller 511 or to bypass the entire cancellation process.

ERL and ERLE estimation 513 computes the echo return loss (ERL) and echo return loss enhancement (ERLE) based on the power level estimators 504, 505, 506 and peak-level power estimator 509. In an illustrative embodiment of the present invention, ERL and ERLE estimation tracking is adjusted based upon whether the egress signal 85 is voice-active, as indicated by doubletalk detector 515.

The ERL is the level at $R_{out}$ minus the level at $S_{in}$ in the absence of speech at $S_{in}$. The ERL estimator tracks the level difference from $R_{out}$ to $S_{in}$ while limiting the change in the estimator 513 when a signal (speech or high level noise) at $S_{in}$ is detected. In an illustrative embodiment of the present invention, the ERL estimator is only run when it appears the signal at $R_{in}$ is active (when the level at $R_{in}$ is appreciably high).

The ERLE is the level at $S_{in}$ minus the level at the input to the NLP 519 again in the absence of speech at $S_{in}$ with appreciable speech at $R_{in}$. (In a far end echo canceller, this would be the near end talker active with the far end talked inactive. In a near end echo canceller, this would be the near end talker inactive with the far end talker active). The ERLE is a measure of how well the linear portion (transversal filter 510 or 511) of the echo canceller 110 is working.

In an illustrative embodiment of the present invention, the far-end echo canceller 110 includes independent doubletalk detection for the NLP 519 and for background canceller adaptation 516. Keeping these separate simplifies interactions between the NLP 519 and background canceller adaptation 516, and each can be tuned for the different criteria required.

In an illustrative embodiment of the present invention, the doubletalk detector 514 for NLP 519 detects when a signal with a significant level is present at $S_{in}$ or when NLP 519 is not required, and subsequently disables the NLP 519. This is essentially done when the level at the output of the digital subtractor 530 is significantly higher than the level at $R_{out}$ minus the ERL and ERLE estimates 513. In other words, if the echo level after linear removal of the echo is lower than the estimated talker level at $S_{in}$ (not including the echo) the NLP 519 should not be activated.

Doubletalk detection 515 for background canceller adaptation 516 is relatively conservative. Due to the dual-canceller feature, if the background canceller 511 diverges the update control would limit divergence. In an illustrative embodiment of the present invention, unless there is proof that there is far end present (in a far end echo canceller), adaptation takes place when the level at $R_{out}$ is significantly high.

In an illustrative embodiment of the present invention, background canceller adaptation 516 is based on a two-stage approach. In stage one, a downsampler reduces the rate of the egress and ingress signals. A full tail canceller is then run on the downsampled signal. A peak picking method is then used on the full tail canceller coefficients in order to determine the most likely windows of significant coefficients. Once these windows are determined, a sparse weighted block-oriented LMS algorithm is used. Since the number of coefficients in this canceller is relatively small, and due to the weighting used, fast convergence is attained.

The short tail canceller 510 is adapted based on tone adaptation 517, which, in an illustrative embodiment of the present invention is an 8-tap LMS algorithm.

Update control 518 is a key portion of the algorithm. The update control is aggressive (likely to copy the coefficients from the background canceller to the foreground canceller), when performance metrics of the echo canceller (namely, ERL, ERLE, and combinations thereof) are indicative of poor performance. For example, if the echo canceller is completely unconverged, coefficients are copied from the background to foreground canceller whenever the short term ERLE of the background canceller is better than the foreground canceller. Once convergence is attained (higher ERLE), copying coefficients from the background canceller to the foreground canceller is delayed. For example, it may take up to 100 msec for the coefficients to be copied if the performance (as per ERL and ERLE is good). Delay is also added when tones are detected, doubletalk is detected, and so on. One component of the invention is to delay the copying of coefficients by a larger time period when performance metrics indicate that performance is good. It is also possible for the background canceller to diverge (perhaps badly) in doubletalk. Although this will not impact the performance of the foreground canceller (if coefficients are not copied) it may impact future adaptation or tracking. As such, if the foreground canceller is significantly better than the background canceller, a copy from the foreground canceller to the background canceller may be performed.

As previously mentioned, the activation of the NLP 519 is controlled by the doubletalk detector 514. The actual implementation of the NLP 519 can be based on a variety of methods. In one embodiment of the present invention, the NLP 519 includes a spectral comfort noise generator that generates comfort noise when the NLP 519 is activated. In another embodiment, when the NLP 519 is activated, it removes the signal and replaces it with silence. In another embodiment, the NLP 519 includes a dynamic compressor that dynamically compresses the level of signal down to the background noise level. In one embodiment of the present invention, any of the above-described schemes are selectable by configuration registers. In another embodiment, an adaptable switched scheme is employed which uses either the spectral comfort noise generator, the dynamic compress, or a combination of both depending on the estimated noise characteristics. For example, if the spectrum of the noise is relatively stationary, then the spectral comfort noise generator is used. If the noise is very dynamic, the dynamic compressor is used. Otherwise, some mixture of the two is used.

In an illustrative embodiment of the present invention, the far-end echo canceller 110 includes a variable gain 523 in the echo path model. This allows the echo canceller 110 to cope with automatic gain control (AGC) in the echo path. Such a variable gain would exist in the echo path if the far-end transceiver includes automatic gain control similar to AGC elements 74 and 108 in FIG. 2.

The variable gain estimator 524 determines the optimum gain to use in order to minimize the error in the signal after the digital subtractor 530. This is a very non-linear optimization problem if the far end speech encoder near end decoder are modeled by voice encoder block 521 and voice decoder block 522, respectively. In an alternative embodiment, the variable gain 523 resides between the voice decode block 522 and the digital subtractor 530. If an array, x, of samples is the "+input" to the digital subtractor 530 and an array, y, of samples is the "−input" to the digital subtractor 530, then the optimal gain, G, to apply at variable gain 523 is that which minimizes the norm of:

$$e = x - Gy$$

The norm of e is:

$$e^T e = x^T x - 2 G x^T y + G^2 y^T y$$

Minimizing with respect to G leads to:

$$G = \frac{x \wedge Ty}{y \wedge Ty}$$

Because this estimate may be corrupted by noise, doubletalk and misconvergence of the adaptive filter 516 and because the far-end AGC can be assumed to adapt relatively slowly, the gain term above can be used as an error term for the gain adaptation. For example, the gain applied in block 523 can be represented as:

$$g(n) = f(g(n-1), G)$$

That is, the gain applied is some function of the previous gain and the gain adjustment, G. In an illustrative embodiment, if the gain adjustment (GdB) is positive, then the gain is increased by some fraction (alpha) from what it was. If the gain adjustment is negative then the gain is decreased by some fraction. If the gain is accurate (i.e., GdB=0) then no adjustment is made. Thus, $$gdB(n) = gdB(n-1) + \text{alpha} * GdB$$

where gdB(n) is the gain g(n) in dB and Gdb is the gain adjustment in dB.

In an illustrative embodiment of the present invention, the gain estimation is also controlled by the doubletalk detector 515. If the doubletalk detector detects near-end voice, the gain adaptation algorithm is frozen.

Referring again to FIG. 2, in an illustrative embodiment of the present invention, a transceiver system 50 includes both a near-end echo canceller 70 and a far-end echo canceller 110. The near-end echo canceller 70 and far-end echo canceller 110 are able to simultaneously suppress both near-end and far-end echo. In an illustrative embodiment, the near-end echo canceller 70 includes much of the same functionality as far-end echo canceller 110. Thus, in an embodiment of the present invention, the near-end echo canceller 70 and far-end echo canceller 110 share some functionality and share some resources. For example, in one embodiment, the near-end echo canceller 70 and far-end echo canceller 110 share power estimators and/or buffering.

The adaptation of the echo path model is usually done when one side is talking and the other isn't. In one embodiment, if it isn't clear whether one or both sides are voice-active, adaptation is nevertheless performed. In one embodiment of the present invention, in a transceiver system, such as system 50 of FIG. 2, that has both a near-end echo canceller 70 and a far-end echo canceller 110, echo path adaptation is not performed for both echo cancellers simultaneously. In this embodiment, the near-end echo canceller 70 and far-end echo canceller 110 inform each other of whether or not they are actively adapting their echo path model. The near-end echo canceller 70 does not adapt its echo path model if the far-end echo canceller 110 is actively adapting its echo path model. Similarly, The far-end echo canceller 110 does not adapt its echo path model if the near-end echo canceller 70 is actively adapting its echo path model. This conserves processing bandwidth.

In another illustrative embodiment of the present invention, the near-end echo canceller 70 and far-end echo canceller 110 inform each other of whether their respective NLPs 73 and 72 are actively suppressing echo. The near-end echo canceller 70 does not adapt its echo path model if the far-end echo canceller NLP 73 is actively suppressing echo. Similarly, The far-end echo canceller 110 does not adapt its echo path model if the near-end echo canceller NLP 72 is actively suppressing echo.

If the far-end echo canceller NLP 73 is on, there is going to be little (if any) echo for the near-end echo canceller 70. Thus, in one embodiment of the present invention, if the level of comfort noise generated (or the level to which the dynamic suppressor suppresses, or the level at the output of the NLP 73 when the NLP is activated) in the far-end echo canceller NLP 73 plus the AGC gain 108 minus the estimated ERL in the near-end echo canceller 70 is less than the threshold of hearing, the near-end echo canceller 70 does not cancel near-end echo. In an illustrative embodiment, this is accomplished by bypassing or freezing the echo path model filter. In another embodiment, other estimators in the near-end echo canceller are bypassed or frozen.

If the near-end echo canceller NLP 72 is on, there is going to be little (if any) echo for the far-end echo canceller 110. Thus, in one embodiment of the present invention, if the level of comfort noise generated in the near-end echo canceller NLP 72 minus the estimated ERL in the far-end echo canceller 110 is less than the threshold of hearing, the far-end echo canceller 110 does not cancel far-end echo. In an illustrative embodiment, this is accomplished by freezing the echo path model filter or by bypassing the tone canceller 510 and foreground canceller 511 using the bypass controller 512. In another embodiment, other estimators in the far-end echo canceller are bypassed or frozen.

Although a preferred embodiment of the present invention has been described, it should not be construed to limit the scope of the appended claims. For example, the present invention is applicable to any real-time media, such as audio and video, in addition to the voice media illustratively described herein. Furthermore, the source of echo may be acoustical echo, electrical echo, or some combination thereof. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A packet voice transceiver, at a first end of a communication network, operable to send and receive voice packets to and from a second packet voice transceiver at a second end of the communication network, the packet voice transceiver comprising:
    a voice encoder operable to receive an outgoing audio signal and to encode the outgoing audio signal to produce an outgoing packet voice signal;
    a packet transmitter operable to transmit the outgoing packet voice signal over the network to the second packet voice transceiver;
    a packet receiver operable to receive an incoming packet voice signal over the network from the second packet voice transceiver;
    a voice decoder operable to decode the incoming packet voice signal to produce an incoming audio signal; and
    a far-end echo canceller operable to reduce echo that is present in the incoming audio signal that originated at the second end; and
    a non-linear processor operable to receive information regarding levels of audio activity in the outgoing audio signal and the incoming audio signal and to mute the outgoing audio signal when the incoming audio signal is greater than the outgoing audio signal by at least a predetermined threshold amount, wherein the non-linear processor is operable to inform the far-end echo canceller of whether the non-linear processor is actively muting the outgoing audio signal and wherein the far-end echo canceller is operable to refrain from reducing echo in the incoming audio signal when the non-linear processor is actively muting the outgoing audio signal.

2. The packet voice transceiver of claim 1, wherein the echo that the far-end echo canceller is operable to reduce is an echo of the outgoing packet voice signal transmitted over the network to the second packet voice transceiver by the packet transmitter.

3. The packet voice transceiver of claim 1 comprising:
    a near-end echo canceller operable to reduce echo that is present in the outgoing audio signal and that originated at the first end.

4. The packet voice transceiver of claim 3, wherein the echo that the near-end echo canceller is operable to reduce is an echo of the incoming audio signal.

5. The packet voice transceiver of claim 3, wherein both the far-end echo canceller and the near-end echo canceller include an echo path model that models an actual echo path, and wherein both the far-end echo canceller and the near-end echo canceller are able to adapt their respective echo path models during operation.

6. The packet voice transceiver of claim 3 comprising:
    another non-linear processor operable to receive information regarding levels of audio activity in the outgoing audio signal and the incoming audio signal and to mute the incoming audio signal when the outgoing audio signal is greater than the incoming audio signal by at least a predetermined threshold amount, wherein the other non-linear processor is operable to inform the near-end echo canceller of whether the other non-linear processor is actively muting the incoming audio signal and wherein the near-end echo canceller is operable to refrain from reducing echo in the outgoing audio signal when the other non-linear processor is actively muting the incoming audio signal.

7. The packet voice transceiver of claim 6 comprising:
    a doubletalk detection unit operable to detect levels of audio activity in the outgoing audio signal and the incoming audio signal and to inform the other non-linear processor of the levels of audio activity in the outgoing audio signal and the incoming audio signal.

8. The packet voice transceiver of claim 1 comprising:
    a doubletalk detection unit operable to detect levels of audio activity in the outgoing audio signal and the incoming audio signal and to inform the non-linear processor of the levels of audio activity in the outgoing audio signal and the incoming audio signal.

9. The packet voice transceiver of claim 1, wherein the echo that the far-end echo canceller is operable to reduce is acoustic echo.

* * * * *